(12) United States Patent
Wagner

(10) Patent No.: US 7,284,330 B2
(45) Date of Patent: Oct. 23, 2007

(54) CUTTING DEVICE FOR WORKPIECES SUCH AS RODS, BOLTS AND THE LIKE, ESPECIALLY FOR THREADED RODS

(75) Inventor: Rudolf Wagner, Stuttgart (DE)

(73) Assignee: REMS-WERK Christian Föll und Söhne GmbH & Co., Waiblingen (DE)

( * ) Notice: Subject to any disclaimer, the term of this patent is extended or adjusted under 35 U.S.C. 154(b) by 0 days.

(21) Appl. No.: 10/708,678

(22) Filed: Mar. 18, 2004

(65) Prior Publication Data

US 2004/0181947 A1 Sep. 23, 2004

(30) Foreign Application Priority Data

Mar. 21, 2003 (DE) .................................. 103 13 827

(51) Int. Cl.
*B26B 15/00* (2006.01)
(52) U.S. Cl. .................. 30/228; 30/92; 30/349
(58) Field of Classification Search .......... 30/92, 30/97, 104, 108, 228, 349; 83/199
See application file for complete search history.

(56) References Cited

U.S. PATENT DOCUMENTS

| | | | | |
|---|---|---|---|---|
| 298,588 | A * | 5/1884 | Jencks | 30/349 |
| 1,276,256 | A * | 8/1918 | O'Reardon | 7/133 |
| 1,278,849 | A * | 9/1918 | Butterworth | 30/191 |
| 1,662,108 | A * | 3/1928 | Fay | 30/193 |
| 2,494,996 | A * | 1/1950 | Geddes | 30/226 |
| 3,181,181 | A | 5/1965 | Buckley et al. | 7/5.6 |
| 4,249,308 | A | 2/1981 | Boyajian | 30/231 |
| 4,531,289 | A * | 7/1985 | Brick | 30/134 |
| 4,549,349 | A * | 10/1985 | Harrison | 30/92 |
| 4,599,795 | A * | 7/1986 | Yokoyama | 30/188 |
| 5,187,869 | A * | 2/1993 | Heiss | 30/189 |
| 5,457,889 | A * | 10/1995 | Kimura | 30/228 |
| 5,537,902 | A * | 7/1996 | Kimura et al. | 83/13 |
| RE35,432 | E * | 1/1997 | LaBounty et al. | 30/134 |
| 5,987,750 | A * | 11/1999 | Tally | 30/92 |
| 2001/0022029 | A1* | 9/2001 | Vary | 30/228 |
| 2003/0005586 | A1* | 1/2003 | Beetz et al. | 30/90.1 |

FOREIGN PATENT DOCUMENTS

| | | |
|---|---|---|
| DE | 1 705 779 | 8/1955 |
| DE | 195 15 955 | 11/1995 |
| FR | 2 529 813 | 1/1984 |
| GB | 444 927 | 3/1936 |
| JP | 63 127 810 | 5/1988 |

* cited by examiner

*Primary Examiner*—Hwei-Siu C. Payer
(74) *Attorney, Agent, or Firm*—Gudrun E. Huckett

(57) ABSTRACT

A cutting device for rod-shaped workpieces has two actuating levers each in the form of a two-arm pivot lever. The two-arm pivot levers each have a first arm as an actuator and a second arm having a shearing edge. The actuators move the shearing edges relative to one another. The pivot levers each have an end face. The end faces rest against one another in the shearing position. The second arms each have a detachable cutting insert, and the shearing edges are arranged on the cutting inserts. The actuators can be engaged by a drive device for pivoting the actuators in opposite direction relative to one another.

14 Claims, 2 Drawing Sheets

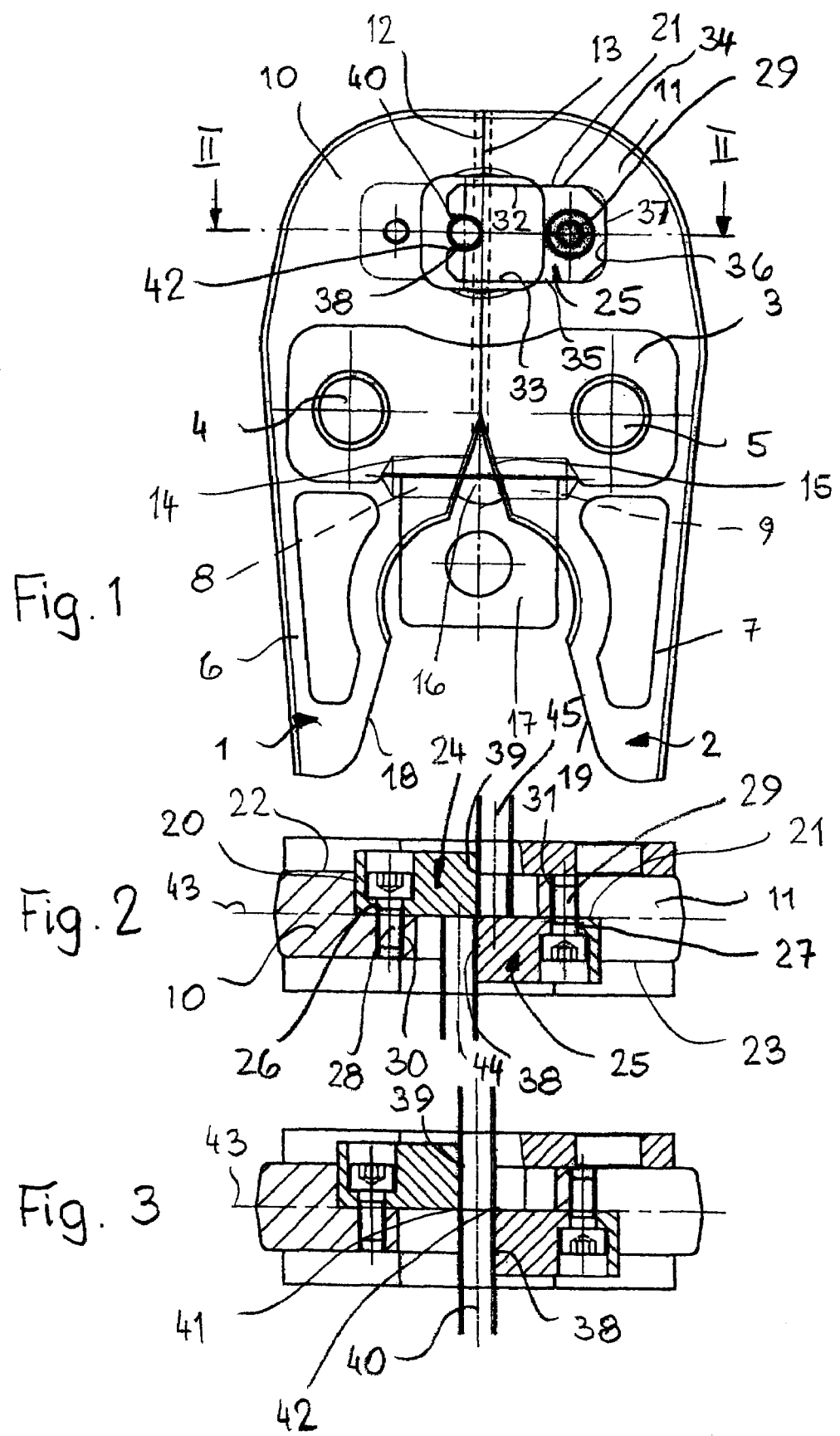

CUTTING DEVICE FOR WORKPIECES SUCH AS RODS, BOLTS AND THE LIKE, ESPECIALLY FOR THREADED RODS

BACKGROUND OF INVENTION

1. Field of the Invention

The invention relates to a cutting device for workpieces, for example, rods, bolts and the like, in particular, for threaded bolts. The cutting device comprises two shearing edges movable relative to one another and two actuating levers.

2. Description of the Related Art

For installing pipelines, in particular, for suspending pipelines, screw-tightened pipe clamps are usually employed that must be positioned by means of threaded rods. Usually, they must be cut to a particular size, sometimes on site. For this purpose, saws, cut-off machines or other special cutting devices are used. When employing saws and cut-off machines, the cut end of the thread is deformed or a burr is generated so that it is possible only with difficulty to screw a nut onto the threaded rod. In the case of special cutting devices, two actuating levers are used that are provided at their free end with a cutting jaw, respectively, for cutting the threaded rod. In this case, there is also a burr or deformation at the end of the thread that makes screwing of a nut onto the thread significantly more difficult. Moreover, such special cutting devices are relatively large.

SUMMARY OF INVENTION

It is an object of the present invention to configure a cutting device of the aforementioned kind such that, while it has a compact configuration, a proper cropping or cutting of the workpieces is possible.

In accordance with the present invention, this is achieved in that the actuating levers are two-arm pivot levers having a first arm configured as an actuating arm (actuator) and a second arm that is provided with the shearing edge, respectively.

In the cutting device according to the invention, two-arm pivot levers are used for the shearing action. With the first lever arm (actuating arm) the pivot levers are pivoted relative to one another in the required direction. The second lever arm is provided with the shearing edges for properly separating or cutting the workpiece to the required length. As a result of the two-arm configuration of the pivot levers, the cutting device according to the invention has a compact size. Despite of its compact size, the cutting device is able to perform a clean cut for separating the workpieces.

BRIEF DESCRIPTION OF DRAWINGS

FIG. 1 is a side view of a cutting device according to the invention.

FIG. 2 is a section along the line II-II of FIG. 1.

FIG. 3 is an illustration corresponding to FIG. 1 of two cutting inserts in the initial position.

DETAILED DESCRIPTION

Figure 1A:
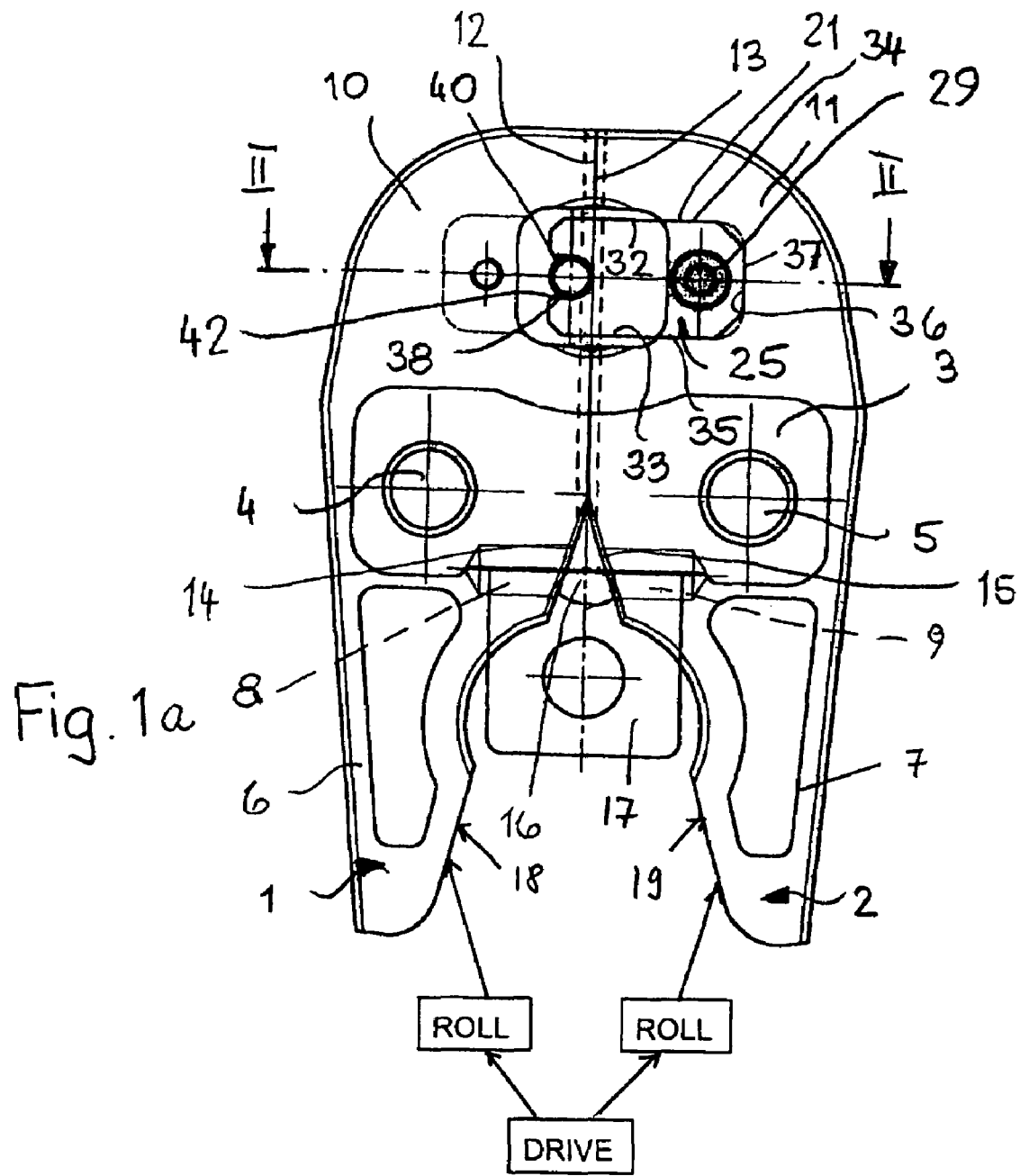
FIG. 1a is a side view of the cutting device showing schematically the drive and associated rolls acting on the actuating arms.

The cutting device is designed to cut or crop rods, bolts and the like, particularly, however, threaded rods, very precisely to the required length in a simple way. The cutting device is configured such that no burrs and the like are formed in the area that is cut. This is particularly advantageous for cutting threaded rods because as a result of the precise cutting action the thread is not damaged so that, for example, nuts can be screwed without problem onto the cut-off end of the threaded rod.

The cutting device has two pivot levers 1, 2 that are pivotably supported by means of bolts 4, 5 between two brackets 3 extending transversely to the pivot levers 1, 2. The bolts 4, 5 connect the brackets 3 with one another and serve as a pivot axis for the two-arm levers 1, 2. The lower actuating arms 6, 7 of the pivot levers 1, 2 illustrated in FIG. 1 are loaded relative to one another by a pressure spring (not illustrated). The pressure spring is positioned in recesses 8, 9 provided in the actuating arms (actuators) 6, 7; the recesses 8, 9 extend perpendicularly to the bolts 4, 5. The pressure spring loads the pivot levers 1, 2 such that the upper arms 10, 11 of the pivot lever are loaded in a direction toward one another. In the end position illustrated in FIG. 1, the pivot levers 1, 2 rest with plane end faces 12, 13 areally against one another. At the level of the bolts 4, 5 the end faces 12, 13 pass into slanted surfaces 14, 15 that diverge relative to one another beginning at the end faces 12, 13. The surfaces 14, 15 are positioned at an acute angle 16 relative to one another. This angle 16 determines the maximum pivot travel that can be performed by the two pivot levers 1, 2 when the actuating arms (actuators) 6, 7 are moved in a direction toward one another. As soon as the slanted surfaces 14, 15 contact one another, the maximum pivot travel of the pivot levers 1, 2 is reached.

The end faces 12, 13 of the actuating arms 6, 7 of the pivot levers 1, 2 can be configured to be stepped (indicated by dashed lines in FIG. 1) so that in the closed position according to FIG. 1 the end faces 12, 13 overlap one another, when viewed in the axial direction of the bolts 4, 5. This overlap becomes effective when the shearing action is carried out. This overlap causes advantageously a support action during the shearing step so that the formation of a burr is reliably prevented during the cutting action.

The cutting device has two brackets 17 positioned between the actuating arms 6, 7 of the pivot levers 1, 2. The brackets 17 are used to connect the cutting device to a drive device. Such a drive device is known in the art and is therefore not explained in more detail in this connection. Such drive devices are used in connection with presses or pressing tongs and have rolls that are fastened on a movable drive rod. This movable drive rod is movable in the longitudinal direction of the cutting device. The rolls move on plane slanted surfaces 18, 19 that are provided on facing inner sides of the actuating arms 6, 7 of the pivot levers 1, 2. FIG. 1a shows schematically a drive and rolls acting on the surfaces 18, 19. When the drive rod with the rolls is extended, the pivot levers 1, 2 are pivoted by the rolls such that their end faces 12, 13 come to rest against one another.

The arms 10, 11 of the pivot levers 1, 2 are provided with a receiving space in the form of a recess 20, 21 that extends from (is arranged with) the respective end faces 12, 13 of the arms 10, 11. As illustrated in FIG. 2, the recesses 20, 21 are open in a direction toward the opposite lateral surfaces 22 and 23 of the arms 10, 11. Into the recesses 20, 21 the cutting inserts 24, 25 are inserted that are identical but mirror-symmetrically arranged to one another. The cutting inserts 24, 25 have an opening 26, 27, respectively, for passing fastening screws 28, 29 therethrough. The screws 28, 29 are screwed into the threaded bores 30, 31 provided in the arms 10, 11. The screw heads are recessed within the cutting inserts 24, 25.

The cutting inserts 24, 25 have a substantially rectangular contour and rest with their longitudinal sides 32, 33 areally against the longitudinal sides 34, 35 of the corresponding recesses 20, 21. Moreover, the cutting inserts 24, 25 rest areally with a narrow side 36 on the narrow side 37 of the recesses 20, 21. In this way, the forces occurring during the cutting process to be described in the following are reliably transmitted onto the pivot levers 1, 2.

The cutting inserts 24, 25 project past the end faces 12, 13 of the arms 10, 11 of the pivot levers 1, 2. On these projecting ends a circular section recess 38, 39 is provided that serves as a receptacle for the threaded rod 40 to be separated or cut. The cutting inserts 24, 25 do not project past the end of the arms 10, 11 that is remote from the pivots in the form of the bolts 4, 5.

The two cutting inserts 24, 25 are staggered relative to one another in the direction of the pivot axis such that their cutting edges 41, 42 are positioned in a common shearing plane 43 that extends perpendicularly to the bolts 4, 5 and is positioned in the illustrated embodiment at half the width of the arms 10, 11 of the pivot levers 1, 2.

The receptacles or recesses 38, 39 extends across the entire thickness of the cutting inserts 24, 25. When threaded rods 40 are to be cut by the cutting device, the recesses 38, 39 of the cutting inserts 24, 25 are provided with a thread that matches the thread of the threaded rod 40 that has to be cut. Therefore, when the threaded rod 40 is inserted into the cutting device, the thread of the threaded rod 40 and of the recesses 38, 39 engage one another in a positive-locking way.

In order for the threaded rod 40 to be inserted into the recesses 38, 39 of the cutting inserts 24, 25, the actuating arms 6, 7 of the pivot levers 1, 2 are pressed together. In this way, the arms 10, 11 move away from one another. The cutting inserts 24, 25 are moved correspondingly to such an extent that they have a spacing relative to one another. The threaded rod 40 can then be inserted into one of the two recesses 38, 39. By means of the thread engagement, the threaded rod 40 is axially secured against movement within the recess 38, 39, respectively. When the arms 6, 7 are released, the pivot levers 1, 2 are loaded by the pressure spring positioned in the recesses 8, 9 such that the arms 10, 11 together with the cutting inserts 24, 25 are pivoted in a direction toward one another. As soon as the recesses 38, 39 surround the threaded rod 40 to be cut, the pivot movement of the pivot levers 1, 2 is terminated. Since the two recesses 38, 39 are semi-circular in shape, the cutting inserts 24, 25 surround in this initial position the threaded rod 40 about its circumference. The end faces 12, 13 of the arms 10, 11 of the pivot levers 1, 2 are spaced apart from one another in this position.

Subsequently, by means of the drive device the rod that supports the pressure rolls is extended. The pressure rolls move onto the slanted surfaces 18, 19 of the actuating arms 6, 7 and push them apart. This causes the cutting inserts 24, 25 to move in a direction toward one another. The shearing edges 41, 42 cut the threaded rod 40 in the area of the shearing plane 43 (FIG. 2). The cutting inserts 24, 25 overlap one another in the cutting position according to FIG. 2. The two sections 44, 45 of the threaded rod 40 produced by the cutting process will not drop out of the cutting inserts 24, 25 after the shearing process because the rod sections 44, 45 are secured by the thread engagement with the cutting inserts 24, 25. After the shearing or cutting process, the drive rod with the pressure rolls is retracted by the drive device to such an extent that, for the purpose of removing the threaded rod sections 44, 45, the actuating arms 6, 7 of the pivot levers 1, 2 can be pressed against one another to such an extent that the threaded sections 44, 45 can be removed from the cutting inserts 24, 25.

Since the recesses 38, 39 of the cutting inserts 24, 25 are provided with the thread, it is ensured during the shearing process that the threaded rod sections 44, 45 cannot tilt relative to one another but are axially aligned relative to one another. The thread of the recesses 38, 39 and the threaded rods 40 prevent an undesirable pivot movement of the threaded rod sections 44, 45 during the separating process. In this way, the threaded end of the threaded rod section 44, 45 that has been cut off is not deformed and no burr is formed. Directly after the shearing process, it is therefore possible without a problem to screw a nut onto the threaded rod end that has been cut off.

Since the cutting inserts 24, 25 are actuated by the two-arm pivot levers 1, 2, the cutting device can be configured to be very compact. The two-arm configuration of the pivot levers 1, 2 enables for small pivot angles a satisfactorily large travel for the cutting inserts 24, 25 during the shearing process.

Depending on the size of the threaded rod 40, different cutting inserts 24, 25 can be attached to the pivot levers 1, 2. The threaded rod 40 can be, for example, of the size M8, M10, and M12. The recesses 38, 39 in the separating or cutting inserts 24, 25 are shaped to match them. Since the cutting inserts 24, 25 are detachably mounted on the pivot levers 1, 2, they can be exchanged without a problem within a very short period of time.

The cutting device is embodied in the form of pressing (cropping) tongs used conventionally for pressing fittings for pipe connections. Such pressing tongs have pressing jaws with which the fittings are, for example, plastically deformed in the radial direction. It is possible to attach such pressing jaws detachably on the pivot levers 1, 2 so that the pressing jaws, as needed, can be exchanged simply for cutting inserts 24, 25. The detachable connection can be achieved, aside from screws, by snap-on connections, for example. For driving the pressing jaws and the cutting inserts, the same drive device can be employed. In this way, a tradesman has available a universal device with which, as needed, he can plastically deform fittings for pipe connections or cut threaded rods.

Instead of threaded rods, the cutting device can also be used, for example, for cutting threaded bolts, rods without a thread, and the like. These parts are inserted such into the recesses 38, 39 of the cutting inserts 24, 25 that they can be cut to the desired length by means of the shearing edges 41, 42.

While specific embodiments of the invention have been shown and described in detail to illustrate the inventive principles, it will be understood that the invention may be embodied otherwise without departing from such principles.

What is claimed is:

1. A cutting device for rod-shaped workpieces, the cutting device comprising:

two actuating levers each comprised of a two-arm pivot lever;

wherein the two-arm pivot levers each comprise a first arm as an actuator and a second arm having a shearing edge and each having a pivot located between the first and second arms;

wherein the actuators have slanted surfaces facing one another and acted upon by a drive unit for moving the shearing edges relative to one another by pivoting the second arms about the pivots;

wherein the second arms each have an end face and the end faces are facing one another;

wherein the second arms each comprise a separate cutting insert, wherein the shearing edges are arranged on the cutting inserts, and wherein the cutting inserts are detachably fastened to and arranged within the end faces of the second arms, so that the cutting inserts do not project past an end of the second arms that is remote from the pivots, respectively;

wherein the cutting inserts are identical and are mirror-symmetrically arranged relative to one another;

wherein the cutting inserts are staggered relative to one another in a direction of a pivot axis of the pivots such that the shearing edges are positioned in a common shearing plane.

2. The cutting device according to claim 1, wherein the end faces in a shearing position of the cutting device rest against one another.

3. The cutting device according to claim 1, wherein the actuators are configured to be engaged by a drive device for pivoting the actuators in opposite direction relative to one another.

4. The cutting device according to claim 1, wherein the cutting inserts each have a receptacle for a workpiece to be cut.

5. The cutting device according to claim 4, wherein the receptacles each extend across an entire thickness of the cutting inserts, respectively.

6. The cutting device according to claim 4, wherein the receptacle is a recess provided in an edge of the cutting insert in which the receptacle is provided.

7. The cutting device according to claim 4, wherein the receptacle has a cross-section in the shape of a circular section.

8. The cutting device according to claim 4, wherein the receptacle has a support area for a workpiece to be cut and wherein the support area has a thread.

9. The cutting device according to claim 8, wherein the thread of the support area of the receptacle matches a thread of the workpiece to be cut.

10. The cutting device according to claim 1, wherein the cutting inserts each project past an end face of the oppositely positioned second arm of the pivot lever, respectively.

11. The cutting device according to claim 1, wherein the second arms each have a receiving space for the cutting inserts, wherein the cutting inserts each have lateral edges and rest with at least a portion of the lateral edges on sidewalls of the receiving spaces of the second arms, respectively.

12. The cutting device according to claim 11, wherein the receiving spaces are recesses in the second arm.

13. The cutting device according to claim 1, wherein the cutting inserts are configured to be exchangeable for pressing jaws.

14. A cutting device for rod-shaped workpieces, the cutting device comprising:

two actuating levers each comprised of a two-arm pivot lever each having a pivot;

wherein the two-arm pivot levers each comprise a first arm as an actuator and a second arm having a shearing edge;

wherein the actuators move the shearing edges relative to one another;

wherein the actuators each have an inner side facing one another, wherein the inner sides each have a slanted surface and wherein the slanted surfaces converge in a direction toward the second arms;

brackets positioned between the actuators, wherein the brackets are adapted to connect the cutting device to a drive device;

wherein the slanted surfaces cause the actuators to be pushed apart when pressure rolls of a drive device roll on the slanted surfaces toward the second arms when the drive device is actuated so that the shearing edges move toward one another to perform a cut;

wherein the second arms each have an end face and the end faces are facing one another;

wherein the second arms each comprise a separate cutting insert, wherein the shearing edges are arranged on the cutting inserts, and wherein the cutting inserts are detachably fastened to and arranged within the end faces of the second arms, so that the cutting inserts do not project past an end of the second arms that is remote from the pivots, respectively;

wherein the cutting inserts are identical and are mirror-symmetrically arranged relative to one another;

wherein the cutting inserts are staggered relative to one another in a direction of a pivot axis of the pivots such that the shearing edges are positioned in a common shearing plane.

* * * * *